United States Patent [19]

Barbeau

[11] Patent Number: 4,605,101
[45] Date of Patent: Aug. 12, 1986

[54] SELF-CONTAINED TURBINE ENGINE LUBRICATION SYSTEM

[75] Inventor: Dennis E. Barbeau, Lambertville, Mich.

[73] Assignee: Teledyne Industries, Inc., Los Angeles, Calif.

[21] Appl. No.: 679,931

[22] Filed: Dec. 10, 1984

[51] Int. Cl.$^4$ ............................................. F01M 9/10
[52] U.S. Cl. .................................................. 184/6.11
[58] Field of Search ...................... 184/6.11, 6.3, 6.26, 184/11.1; 277/134, 170, 196.1

[56] References Cited

U.S. PATENT DOCUMENTS

| | | | |
|---|---|---|---|
| 1,511,481 | 10/1924 | Koelker | 277/134 |
| 3,929,340 | 12/1975 | Peisker | 277/134 |
| 3,934,888 | 1/1976 | Lutz | 277/134 |
| 3,941,396 | 3/1976 | Bailey et al. | 277/134 |
| 4,144,950 | 3/1979 | Moyer et al. | 184/6.11 |

*Primary Examiner*—Louis J. Casaregola
*Assistant Examiner*—Timothy S. Thorpe
*Attorney, Agent, or Firm*—Gifford, Groh, VanOphem, Sheridan, Sprinkle & Dolgorukov

[57] ABSTRACT

The present disclosure provides an inexpensive self contained lubrication system for the bearing which rotatably mounts a turbine engine shaft to the support housing in a turbine engine. The lubrication system includes a first seal assembly which extends between the shaft and the housing at a position axially spaced from one side of the bearing assembly and a second seal assembly extending between the shaft and the housing at the position axially spaced from the other side of the bearing assembly. The bearing assemblies form a sump chamber in the support housing which contains a lubricant. Each bearing assembly includes a resilient O-ring extending between the shaft and the support housing while two impellers attached to the shaft within the sump chamber pump the lubricant in the sump chamber through the bearing assembly and back to the sump chamber during shaft rotation.

9 Claims, 2 Drawing Figures

SELF-CONTAINED TURBINE ENGINE LUBRICATION SYSTEM

BACKGROUND OF THE INVENTION

I. Field of the Invention

The present invention relates generally to lubrication systems and, more particularly, to a self-contained lubrication system for a turbine shaft bearing in a turbine engine.

II. Description of the Prior Art

There are many applications for turbine engines where only a short life of the turbine engine is expected during normal use. Such applications include expendable engines for missiles, targets and remotely piloted vehicles.

In such turbine engines, a low cost, high single mission reliability for the lubrication systems is much more desirable than a long life reusable lubrication system. Furthermore, for turbine engines having no maintenance storage requirements such as for missiles the lubrication system must not allow leakage of oil during static conditions as would occur during such long term storage of the engine and must not allow excessive leakage of oil during operation although some leakage can be tolerated. Furthermore, it is highly desirable to be able to check the integrity of the lubrication system simply and rapidly before use of the turbine engine.

There are no turbine engine lubrication systems known to the Applicant which meet all of the above mentioned criteria.

SUMMARY OF THE PRESENT INVENTION

The present invention provides a self-contained lubrication system for turbine engines which is particularly suitable for turbine engines having relatively short operational life span.

In brief, the lubrication system of the present invention is designed for use in a turbine engine having a support housing in which a drive shaft is rotatably mounted by a bearing assembly. A first seal assembly extends axially between the shaft and the support housing at a position axially spaced from one side of the bearing assembly while, similarly, a second seal assembly extends between the shaft and the support housing at a position axially spaced from the other side of the bearing assembly. A sump chamber in which a lubricant, such as oil, is contained is formed in the support housing between the seal assemblies.

Each seal assembly of the present invention comprises a resilient O ring which is sandwiched in between the support housing and the shaft and thus prevents leakage of lubrication from the sump chamber during static conditions. During operation of the engine, these O rings deteriorate during the initial rotation of the shaft due to friction between the O rings and the support housing and/or the shaft. However, within a short time after operation of the engine begins, some oil from within the sump chamber will lubricate the O rings thus slowing the deterioration of the O rings and allowing some, but not excessive, lubricant leakage from the sump chamber. Sealing of these O rings can be enhanced, and wear reduced by slanting them slightly relative to the axis of the shaft. This wipes the metal surface with oil on each revolution thus lubricating the seal area.

In order to prevent excessive leakage and to circulate the lubricant through the bearing assembly, a first impeller is secured to the shaft adjacent one O ring while, similarly, a second impeller is secured to the shaft adjacent the other O ring. A transfer housing contained within the chamber includes at least one and preferably several passageways open at one end to the first impeller and at its other end to the bearing assembly so that rotation of the impeller pumps liquid through the transfer housing passageway and thus through the bearing assembly. The second impeller pumps the lubricant away from the other seal and through passageways formed in the support housing and back to the sump chamber for recirculation through the bearing assembly.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
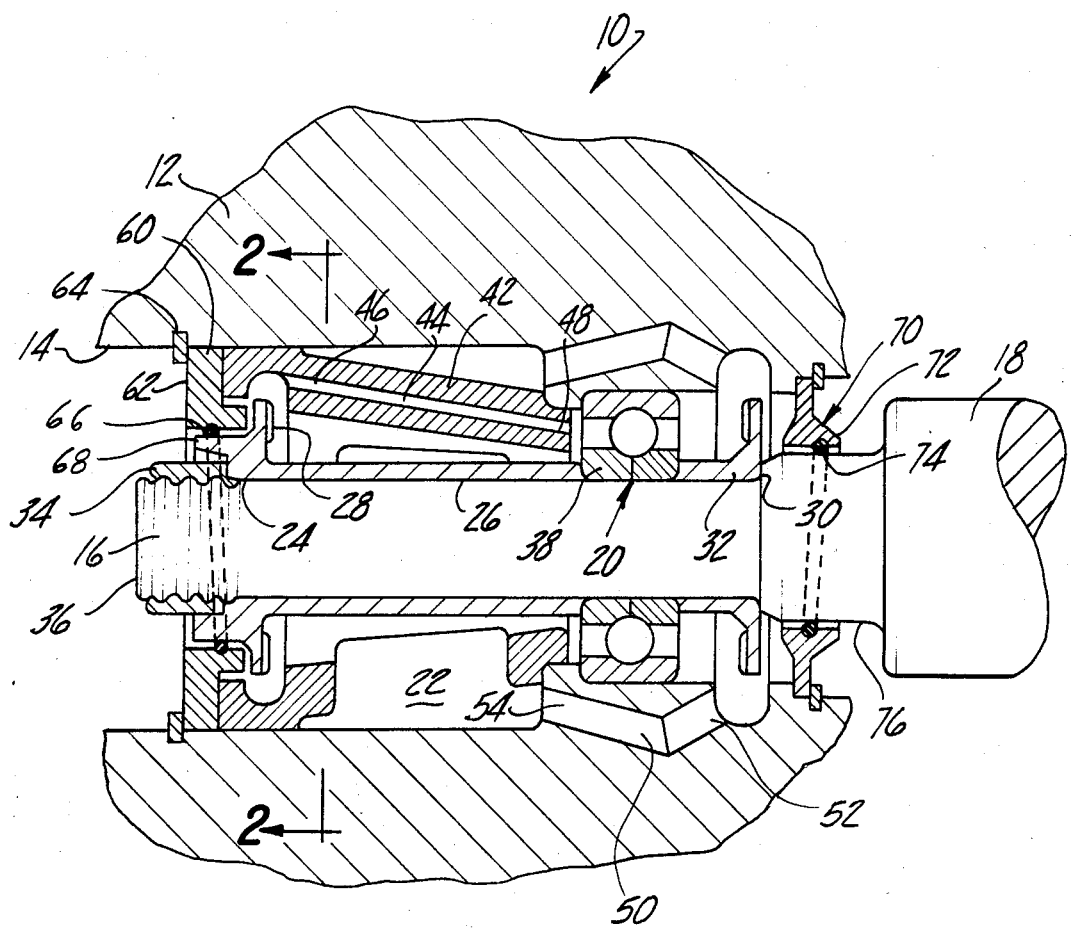
FIG. 1 is a fragmentary longitudinal sectional view illustrating a preferred embodiment of the present invention.

With reference first to FIG. 1, a portion of a turbine engine 10 is thereshown having a support housing 12 with a cylindrical cavity 14. A stub end 16 of a turbine main shaft 18 is positioned within the cylindrical cavity 14 and is rotatably mounted to the support housing 12 by a bearing assembly 20.

The housing cavity 14 forms a sump chamber 22 in which a lubricant or oil is contained to lubricate the bearing assembly 20 during operation of the turbine engine 10. In order to prevent leakage of the oil from the sump chamber 22, a first seal assembly 60 extends between the support housing 12 and shaft 18 adjacent the stub end 16 of the shaft 18. The seal assembly 60 comprises a seal carrier 62 secured to the support housing 12 by a retainer ring 64. A resilient O-ring 66 is carried at the inner radial end of the carrier 62 and the O ring 66 frictionally engages a cylindrical surface 68 formed on an impeller 24. The carrier 62 and the O ring 66 are dimensioned so that the O ring 66 is sandwiched in between the carrier 62 and the impellers 24 thus preventing leakage of oil from one end of the sump chamber 22 during static conditions.

Similarly, a second seal assembly 70 is provided between the support housing 12 and the shaft 18 adjacent the other end of the cavity 14. The second seal assembly 70 includes an annular seal carrier 72 which carries a resilient O ring 74 in a groove at its inner radial end. This O ring 74 is sandwiched in between the seal carrier 72 and a cylindrical portion 76 on the shaft 18 so that the seal assemblies 60 and 70 together prevent leakage of oil from the sump chamber 22 during static conditions.

Both the O rings 66 and 74 are slightly slanted with respect to the axis of the shaft 18 for a reason to be subsequently described. In order to keep the oil away from the seal and circulate the oil from the sump chamber 22 and through the bearing assembly 20, the first impeller 24 having a sleeve portion 26 is positioned coaxially around the end 16 of the turbine shaft 18 so that the impeller 24 is axially spaced from the bearing assembly 20. The impeller 24 preferably includes radially extending vanes 28 although grooves or the like may be alternatively employed.

Similarly, a second impeller 30 having a sleeve portion 32 is positioned between the other axial end of the bearing assembly 20 so that the bearing assembly 20 is positioned between the impellers 24 and 30. A nut 34 threadably engages a free end 36 of the shaft 18 and, upon tightening, secures both impellers 24 and 30, as well as an inner race 38 of the bearing assembly 20, to the shaft 18.

Figure 2:
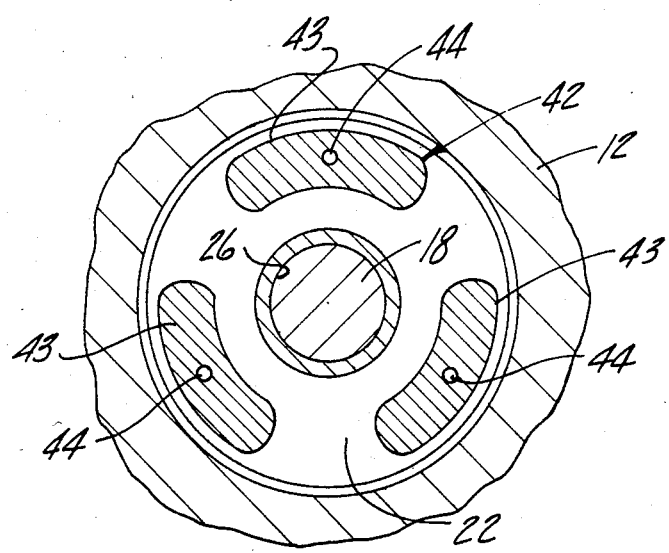
FIG. 2 is a cross-sectional view taken substantially along line 2—2 in FIG. 1.

Referring now to FIGS. 1 and 2, an annular conical transfer housing 42 is positioned within the sump chamber 22 and coaxially around the shaft 18. Preferably, the transfer housing has three axially extending and circumferentially spaced struts 43 (FIG. 2) which support the axial load. The transfer housing 42 includes at least one axially extending passageways 44 having one end 46 open adjacent the first impeller 24 and its other end 48 open to one axial end of the bearing assembly 20. Preferably, one passageway 44 is formed through each strut 43. Similarly, at least one and preferably several axially extending and circumferentially spaced passageways 50 are formed in the housing so that one end 52 of each passageway 50 is open to the second impeller 30 while the other end 54 of the passageway 50 is open to the sump chamber 22. These passageways 50 extend axially around the bearing assembly 20.

Consequently, during rotation of the shaft 18, the first impeller 24 pumps oil from the sump chamber 22, through the transfer housing passageways 44 and thus away from the seal 66 and through the bearing assembly 20 in the desired fashion. After passing through the bearing assembly 20, the second impeller 30 pumps the oil through the support housing passageways 50 away from the seal 74 and back to the sump chamber 22 via an annular chamber formed between the transfer housing 42 and cavity 14 for recirculation through the bearing assembly 20. The heat from the oil in the sump chamber 22 is dissipated by conduction through the support housing 12.

During operation of the engine and as the shaft 18 is rotatably driven with respect to the support housing 12, the impellers 24 and 30 circulate the oil from the sump chamber 22 away from the seals 74 and 66 and through the bearing assembly 20 in the previously described fashion. Simultaneously, the O-rings 66 and 74 will begin to deteriorate due to friction between the stationery seal carriers and the rotating shaft 18 or components attached to the shaft 18. Some oil mist, however will reach the seals after a short period of time and not only slow the further deterioration of the O rings 66 and 74 but also enhance the seal provided by the O rings due to surface tension of the oil. Some further leakage of oil mist will inevitably occur through the O rings 66 and 74 but such leakage will be small since the impellers prevent liquid oil from reaching the seals, and such leakage can be tolerated due to the short operating life of the turbine engine 10.

In order to limit the leakage of oil past the O-rings 66 and 74 during operation of the engine, the outer radial periphery of each impeller 24 and 30 is preferably spaced radially outwardly from their respective adjacent O-rings 66 and 74. This construction ensures that the liquid oil pumped by the impellers 24 and 30 will be pumped through the passageways 44 or 50, respectively, rather than leaking past the O rings 66 and 74.

Thus, the impellers 24 and 30 ensure that only oil mist will leak past the seals 66 and 74 and such leakage is small and tolerable.

A primary advantage of the engine lubrication system of the present invention resides in its low cost construction. In particular, the entire lubrication system is self contained thus eliminating the need for auxiliary oil pumps, oil coolers and the like. Furthermore, the O rings provide a very inexpensive seal between the shaft and the support housing which is adequate for the short expected operating life of the turbine engine.

A still further advantage of the present invention is that the integrity of the engine lubrication system can be easily tested prior to operation of the engine. In particular, it is only necessary to determine the ability of the sump chamber 22 to hold a predetermined pressure. If the sump chamber 22 holds such pressure, the O rings 66 and 74 can be presumed to be intact and operational. Conversely, if the sump chamer 22 is unable to hold pressure, one or both of the O rings 74 may be presumed to have failed since no other escape of pressure from the sump chamber 22 is possible due to the self contained construction of the lubrication system. In this latter event, the O rings 66 and 74 can be easily and inexpensively replaced.

A still further advantage of the present invention is the provision of slanting the plane of the O-rings 66 and 74 with respect to the axis of the shaft 18. In doing so oil is wiped on the portion of the shaft or seal carrier which engages the seal during each shaft revolution and enhances the fluid seal.

Having described my invention, however, many modifications thereto will become apparent to those skilled in the art to which it pertains without deviation from the spirit of the invention as defined by the scope of the appended claims.

I claim:

1. A self contained lubrication system for a turbine engine, said turbine engine having a support housing and a drive shaft rotatably mounted to the support housing by a bearing assembly, said lubrication system comprising:
    a first seal assembly extending between said shaft and said housing at a position axially spaced from one side of the bearing assembly;
    a second seal assembly extending between said shaft and said housing at a position axially spaced from the other side of said bearing assembly;
    a sump chamber adapted to contain a lubricant formed in said housing between said seal assemblies; and
    means contained in said sump chamber for pumping lubricant contained in said sump chamber through said bearing assembly during rotation of said shaft, said pumping means having a radial outer periphery;
    wherein each seal assembly comprises a resilient O-ring sandwiched between a stationary portion of said housing and a rotating portion of said shaft and wherein said O-rings are spaced radially inwardly from said outer periphery of said lubricant pumping means such that said pumping means pumps fluid away from said O-rings.

2. The invention as defined in claim 1 wherein said pumping means comprises an impeller secured to said shaft adjacent one seal assembly.

3. The invention as defined in claim 2 wherein said pump means further comprises a second impeller secured to said shaft adjacent the other seal assembly.

4. The invention as defined in claim 3 and comprising a lubricant transfer housing positioned within said sump chamber, said transfer housing having at least one passageway open at one end to said first impeller and open at its other end to said bearing assembly.

5. The invention as defined in claim 4 wherein said transfer housing is spaced inwardly from said support housing thus forming an annular chamber therebetween, and comprising at least one fluid passageway having one end open to the second impeller and its other end open to said annular chamber.

6. The invention as defined in claim 3 wherein the radial outer periphery of each impeller is spaced radially outwardly from its adjacent O-ring so that said impellers pump fluid away from said O-rings.

7. The invention as defined in claim 3 wherein each impeller includes a plurality of radially extending fins, said fins facing toward said bearing assembly.

8. The invention as defined in claim 1 wherein the plane of at least one O-ring is slanted with respect to the axis of the shaft.

9. The invention as defined in claim 1 wherein the planes of both O-rings are slanted with respect to the axis of the shaft.

* * * * *